United States Patent [19]

Barron

[11] 4,121,891
[45] Oct. 24, 1978

[54] TAPE PLAYER CLEANING DEVICE

[76] Inventor: Guy W. Barron, 3189 Monticello Dr., Jackson, Miss. 39212

[21] Appl. No.: 762,510

[22] Filed: Jan. 26, 1977

[51] Int. Cl.$^2$ .................. A47L 13/26; B43K 5/10; B05C 21/00
[52] U.S. Cl. .................... 401/37; 401/176; 401/196
[58] Field of Search .............. 401/37, 196–207, 401/176

[56] References Cited

U.S. PATENT DOCUMENTS

| 362,109 | 5/1887 | Puellmann | 401/37 |
| 1,027,127 | 5/1912 | Harvey | 401/176 |
| 2,227,710 | 1/1941 | Finn | 401/37 X |
| 3,007,881 | 4/1974 | Seidler | 401/196 X |

Primary Examiner—Stephen C. Pellegrino
Attorney, Agent, or Firm—Cushman, Darby & Cushman

[57] ABSTRACT

The tape player cleaning device comprises an elongated cylinder having felt pads at either end. One felt pad is designed to remain dry while the other felt pad is provided with a liquid solvent cleaning substance from an internal reservoir chamber with such supply being controlled by a manually actuated plunger mechanism connected to an actuating lever extending outwardly through a longitudinal slot in the barrel of the device. In operation, the end having the felt tip which is to be supplied with liquid is threadably removed whereupon the reservoir is filled by retraction of the plunger and the felt tip is threadably reconnected to its respectively associated end of the device. Thereafter, the tape player parts which require cleaning are accessed by this felt tip end which is supplied with a suitable amount of cleaning fluid by simultaneous manual actuation of the plunger mechanism. Finally, the device is reversed and the dry felt tip end is utilized for drying the cleaned portions of the tape playing mechanism.

1 Claim, 1 Drawing Figure

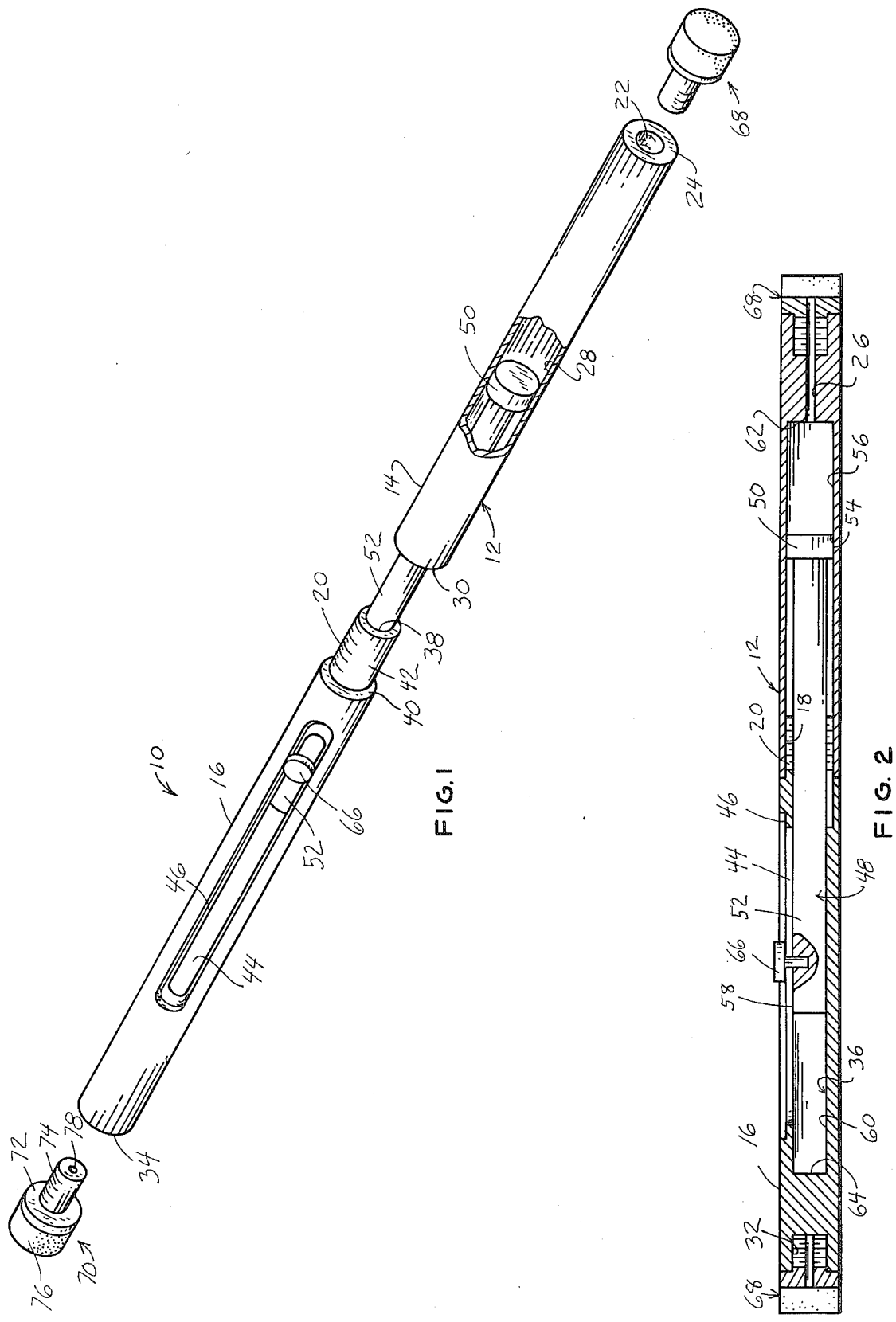

TAPE PLAYER CLEANING DEVICE

BACKGROUND OF THE INVENTION

The following prior issued U.S. patents are representative of those directed to the art of cleaning tape playing mechanisms:

U.S. Pat. No. 3,069,815 — Valentine (1962)
U.S. Pat. No. 3,439,922 — Howard (1969)
U.S. Pat. No. 3,594,850 — Wellington (1971)

Both Valentine and Howard utilize the abrasive tape. In addition, Howard describes a brush 60 which may be impregnated with a solvent for use in cleaning an idler wheel 26.

Wellington is directed towards a cleaning cartridge which will spray the solvent material onto the tape recording/reproducing heads. It is not clear how the excess solvent and the material that is to be cleaned from the heads is to be removed. Presumably, one would remove such material with a cotton swab, Q-tip or the like.

Cylindrically shaped devices having liquid reservoirs for supplying felt tips or the like are well-known as marking implements. Exemplary of these prior issued patents are the following:

U.S. Pat. No. 946,146 — Newman (1910)
U.S. Pat. No. 1,297,675 — Garvey (1919)
U.S. Pat. No. 2,143,712 — Rissman (1939)
U.S. Pat. No. 2,453,201 — Cushman (1948)

The cylindrically shaped reservoir filled by retracting a plunger mechanism is well known in the fountain pen structure of which the following prior issued U.S. patent is exemplary:

U.S. Pat. No. 1,317,817 — Ogilvy (1919)

SUMMARY OF THE INVENTION

The present invention provides a tape player cleaning apparatus in a shape of an elongated cylinder having felt tips or the like at both ends of the structure, and a reservoir for feeding liquid solvent material to only one of the felt tip ends. That liquid reservoir is filled by manipulating a plunger and is controllably unloaded into its respectively associated felt tip end by manual actuation of the plunger mechanism as well.

The principles of the invention will be further discussed with reference to the drawing wherein a preferred embodiment is shown. The specifics illustrated in the drawing is intended to exemplify, rather than limit, aspects of the invention as defined in the claims.

BRIEF DESCRIPTION OF THE DRAWING

IN THE DRAWING

FIG. 1 is an exploded perspective view of a tape player cleaning device constructed in accordance with the principles of the present invention, and FIG. 2 is a longitudinal sectional view thereof.

DETAILED DESCRIPTION OF THE PRESENTLY PREFERRED EMBODIMENT

The tape player cleaning device 10 includes a tubular barrel or cylinder member 12 that is shown constituted by two sections, 14 and 16 which telescopically screw together at 18, 20.

The barrel section 14 has an internally threaded socket 22 coaxially formed in its outer end 24. A conduit 26 leads coaxially inwards from the base of the socket a short distance whereupon it emerges into a larger diameter coaxial chamber 28 which extends to the inner end 30 of the barrel section 14. The barrel section 14 is internally threaded at 18, adjacent the inner end 30.

The barrel section 16 has an internally threaded socket 32 coaxially formed in its outer end 34. From within the barrel section 16, axially inwardly from the base of the socket 32, a coaxial chamber 36 extends to the inner end 38. The chamber 36 is of a smaller bore than the chamber 28. Adjacent the inner end 38, the barrel section 16 undergoes a reduction in external diameter, providing a stop shoulder 40 and a smaller diameter band 42 which externally bears the threading 20. The barrel sections are mated by coaxially presenting the band 42 against the inner end 30 of the barrel section 14 and relatively counter rotating the barrel sections, until the threads 18, 20 are fully made up and the inner end 30 homes against the stop shoulder 40.

Intermediate the ends of the barrel section 16, an axially elongated, angularly narrow slot 44 is formed therethrough. The exterior of the slot is somewhat broader than the remainder, to provide a radially outwardly open recess 46 surrounding the slot 44.

The barrel sections 14, 16 cooperatively house a plunger 48 which includes an axially short radially enlarged head 50 and an axially elongated, smaller diameter rod 52 coaxially mounted to the head 50.

The head 50 has an outer peripheral surface 54 sized to sealingly, slidingly engage the inner peripheral surface 56 of the chamber 28. The rod 52 has an outer peripheral surface 58 sized to slidingly engage the inner peripheral surface 60 of the chamber 36.

The axial distance within the composite chamber 28, 36 between the respective outer ends 62,64 is greater than the axial length of the plunger 48, giving the plunger room to be axially moved within the composite chamber 28,36. Such movement is effected in practice, by a handle or button 66 which is secured to the plunger rod 52 and projects laterally out of the barrel through the slot 44. In the instance shown, the button 66 has an enlarged head, the rear surface of which rides on the base surface of the recess 46.

The structure depicted is completed by two pad assemblies 68, 70. Each comprises an annular base 72 with a tubular, exteriorly threaded shank 74 coaxially extending from the inner face thereof, and a body 76 of liquid-absorbent material such as cotton felt secured on the outer face thereof. If desired, the body 76 may also extend within the bore 78 of the base 72.

The pad assembly 68 is assembled to the outer end of the barrel section 14, by screwing the shank 74 thereof into the socket 22 until the inner face of the base homes against the outer end of this barrel section.

The pad assembly 70 is assembled to the outer end of the barrel section 16, by screwing the shank 74 thereof into the socket 32 until the inner face of the base homes against the outer end of this barrel section.

It should be clear, now, that the chamber 28, axially outwardly of the piston 50 constitutes a liquid reservoir that is in communication with the pad 76 of the assembly 68 via the conduit 26 and the bore 78 of the assembly 68.

It should be equally clear that the blind region 80 isolates the pad 76 of the assembly 70 from the bore.

Thus, the pad assembly 68 constitutes a normally wet, reservoir-fed liquid applicator and the pad assembly 70 constitutes a normally dry, isolated, liquid resorber.

But for the liquid absorbent pads, the device 10 may be made of metal such as aluminum, or plastic, such as molded polystyrene. Although the device may be made in a range of sizes, a typical size would be approximately that of a common pocket-model tire-pressure guage. The pad assemblies 68,70 are typically alike and replaceable.

Typically, the device is used by unscrewing the applicator pad assembly 68, dipping the exposed barrel end in a supply of cleaning liquid, such as common rubbing alcohol, retracting the plunger by sliding the exposed button 66 to draw a supply of cleaning liquid through the conduit 26 into the reservoir, and screwing the pad assembly 68 back in place.

The device 10 is then held barrel-in-hand and the wetted applicator pad 76 of the assembly 68 wiped against the tape player heads, guides and other moving or stationary posts that are to be cleaned.

Then the device 10 is reversed, end-for-end in the user's hand, and the dry pad 76 of the assembly 70 is used to blot and soak up any excess cleaning liquid and to lightly burnish any bits of clinging oxide particles or the like from the parts being cleaned.

It should now be apparent that the tape player cleaning device as described hereinabove, possesses each of the attributes set forth in the specification under the heading "Summary of the Invention" hereinbefore. Because the tape player cleaning device can be modified to some extent without departing from the principles of the invention as they have been outlined and explained in this specification, the present invention should be understood as encompassing all such modifications as are within the spirit and scope of the following claims.

What is claimed is:

1. A tape player cleaning device, comprising:

an elongated barrel having two ends and including means defining a threaded socket at each end thereof;

a liquid-absorbent pad secured on each end of the barrel, each pad is incorporated in a pad assembly which includes a threaded shank which is removably threaded in the respective of said threaded sockets;

means defining a cleaning liquid reservoir within the elongated barrel;

conduit means communicating the liquid reservoir to only one of said liquid-absorbent pads, the other being isolated from said liquid reservoir;

the threaded shank of the pad being communicated with the liquid reservoir is tubular to facilitate such communication therethrough;

said elongated barrel being constituted by two telescopically screwed-together sections each providing a respective portion of said cleaning liquid reservoir including a first cleaning liquid reservoir portion of larger diameter inner peripheral surface proximate the said tubular-shanked pad, and a second cleaning liquid reservoir portion of smaller diameter inner peripheral surface distally of the said tubular-shanked pad;

a plunger including an enlarged head having an outer peripheral surface in sliding, sealing engagement with said larger diameter inner peripheral surface cleaning liquid reservoir portion, and a rod extending coaxially therefrom in sliding engagement with said smaller diameter inner peripheral surface cleaning liquid reservoir portion;

means defining a longitudinally extending slot through the barrel into said smaller diameter inner peripheral surface cleaning liquid reservoir portion, said barrel further including outwardly opening recess means surrounding said slot at least along the laterally opposite flanks of said slot; and a button having a head received in said recess means and a shank extending from said head through said slot and connecting with said plunger rod within said cleaning liquid reservoir, so that, upon temporary removal of said tubular-shanked pad, said plunger may be axially retracted by sliding said button along said slot from outside the barrel in a sense to draw cleaning liquid into the cleaning liquid reservoir through the respective end of said barrel for providing and replenishing the supply of cleaning liquid in the reservoir, whereby, in use, the barrel may be hand-held and manipulated with the pad that is communicated with the liquid reservoir against parts of the tape player to be cleaned, for applying cleaning liquid and for scrubbing said parts, and for drying said parts, the barrel may be reversed end-for-end in the hand and the liquid-absorbent pad that is isolated from the liquid reservoir rubbed against said parts to absorb the applied cleaning liquid.

* * * * *